United States Patent
Singh et al.

(10) Patent No.: US 10,146,363 B2
(45) Date of Patent: Dec. 4, 2018

(54) HIGHLY EFFICIENT CHARGE PUMP SYNCHRONIZED TO THE DRIVE SIGNAL OF A TOUCH SCREEN SYSTEM

(71) Applicant: STMicroelectronics Asia Pacific Pte Ltd, Singapore (SG)

(72) Inventors: Abhishek Singh, Singapore (SG); Hugo Gicquel, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 62 days.

(21) Appl. No.: 15/234,243

(22) Filed: Aug. 11, 2016

(65) Prior Publication Data

US 2018/0046309 A1 Feb. 15, 2018

(51) Int. Cl.
*G06F 3/041* (2006.01)
*G06F 3/044* (2006.01)
*H02M 3/07* (2006.01)

(52) U.S. Cl.
CPC ............ *G06F 3/0416* (2013.01); *G06F 3/044* (2013.01); *H02M 3/07* (2013.01)

(58) Field of Classification Search
CPC .......... G06F 3/041–3/047; H03L 7/08–7/0898
See application file for complete search history.

(56) References Cited

U.S. PATENT DOCUMENTS

| | | | | |
|---|---|---|---|---|
| 8,427,452 B2* | 4/2013 | Rai | ........................ | G06F 3/0416 |
| | | | | 345/173 |
| 9,195,352 B2* | 11/2015 | Akai | ........................ | G06F 3/044 |
| 2012/0306801 A1* | 12/2012 | Rai | ........................... | G06F 3/044 |
| | | | | 345/174 |
| 2017/0108987 A1* | 4/2017 | Park | ....................... | G06F 3/0418 |

* cited by examiner

*Primary Examiner* — Gene W Lee
(74) *Attorney, Agent, or Firm* — Crowe & Dunlevy (57) ABSTRACT

An alternating current (AC) drive signal having a first frequency and a high logic level at a boosted supply voltage is applied to drive a capacitive sensing line of a capacitive touch panel. The boosted supply voltage is generated by boosting an input voltage. The voltage boosting is effectuate by a charge pump circuit operating synchronous to assertion of the AC drive signal with a charge transfer time that is adaptable to different capacitive load conditions.

20 Claims, 5 Drawing Sheets

HIGHLY EFFICIENT CHARGE PUMP SYNCHRONIZED TO THE DRIVE SIGNAL OF A TOUCH SCREEN SYSTEM

TECHNICAL FIELD

The present invention relates to a capacitive touch screen system and, in particular, to the operation of a charge pump circuit powering driver circuits that generate touch screen drive signals.

BACKGROUND

Figure 1:
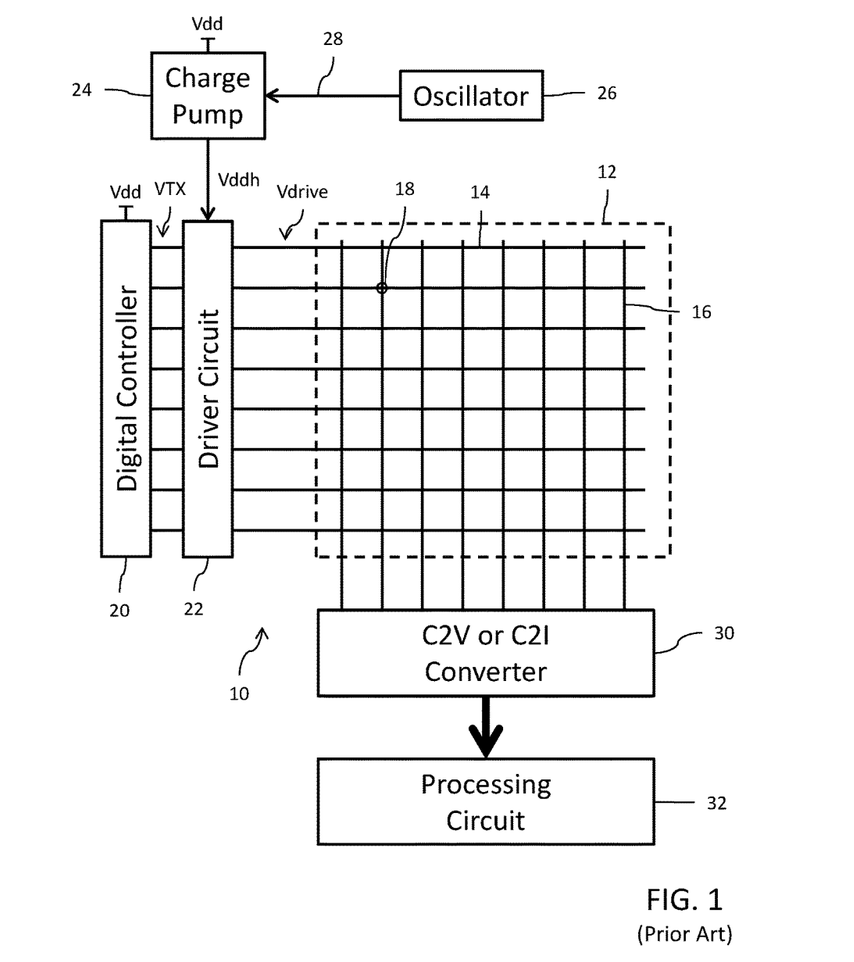
FIG. 1 shows a conventional configuration for a touch screen system.

Reference is made to FIG. 1 showing a conventional configuration for a touch screen system 10. The system 10 includes a touch panel 12 formed by a plurality of parallel drive lines 14 and a plurality of parallel sense lines 16. The drive lines 14 and sense lines 16 are typically formed of a transparent material (such as, for example, indium tin oxide ITO) so as to not obscure a visual display system (not shown) positioned underneath the panel 12. The drive lines 14 and sense lines 16 can, for example, each be formed of a plurality of series connected diamond shapes. The drive lines 14 extend across the panel 12 with a first orientation direction (for example, horizontal) and the sense lines 16 extend across the panel 12 with a second orientation direction (for example, vertical) such that the lines 14 cross over the lines 16 (or vice versa). However, the plane containing the lines 14 and the plane containing the lines 16 are typically separated from each other by a layer of dielectric material. A sense capacitor 18 is accordingly formed at each location where the lines 14 and 16 cross.

A digital controller circuit 20 generates an alternating current (AC) drive signal (VTX), for example, in the form of a square wave, and sequentially applies that AC drive signal to the drive lines 14 through a driver circuit 22. The AC drive signal has a frequency fd that is, for example, in the range of 100-300 kHz and is typically at 200 kHz.

The digital controller circuit 20 is powered from a power supply voltage Vdd, with Vdd typically at 3.3V. The driver circuit 22, however, is powered from a power supply voltage Vddh, where Vddh>Vdd, with Vddh for example at 6V, 9V, 12V, 16V higher as needed. A charge pump circuit 24, powered from the power supply voltage Vdd, operates to boost the Vdd voltage to produce the Vddh voltage. An oscillator circuit 26 provides an AC signal 28 to the charge pump circuit 24 to control the boost switching operation of a flyback capacitor that generates the Vddh voltage. The AC signal 28 has a frequency fo that is, for example, in the range of 10-100 MHz and is typically at 48 MHz.

The driver circuit 22 includes a level shifting and buffering circuit to level shift the AC drive signal output from the digital controller circuit 20 from the Vdd voltage level to the Vddh voltage level to generate the level-shifted AC drive signal (Vdrive) for application to the drive lines 14.

A charge conversion circuit 30 such as a charge to voltage (C2V) converter circuit (or a charge to current (C2I) converter circuit) is coupled to the sense lines 16. The conversion circuit 30 senses the charge at each sense capacitor 18 and converts the sensed charge to an output signal (voltage or current) indicative of the sensed charge. The amount of charge at each sense capacitor 18 is a function of the AC drive signal, the capacitance between the drive line 14 and sense line 16 at the sense capacitor 18 and the influence of a touch capacitance contributed by the presence of an object (such as a finger or stylus) in proximity to the drive lines 14 and sense lines 16 of the panel 12. A processing circuit 32 receives the output voltages from the conversion circuit 30 for each sense capacitor 18. The output voltages are processed to determine the presence (touch and/or hover) of the object and the location of the object.

SUMMARY

In an embodiment, a circuit comprises: a driver circuit configured to apply an alternating current (AC) drive signal having a first frequency to a capacitive sensing line of a capacitive touch panel, said driver circuit powered by a boosted supply voltage; and a charge pump circuit configured to receive an input supply voltage and output the boosted supply voltage, wherein said charge pump circuit is enabled to perform a voltage boosting operation synchronous to assertion of the AC drive signal. This voltage boosting operation is further adaptive to different capacitive loads of the capacitive touch panel receiving the AC drive signal by adjusting a slew-rate for charge transfer in the voltage boosting operation.

In an embodiment, a circuit comprises: a driver circuit configured to apply an alternating current (AC) drive signal having a first frequency to a capacitive sensing line of a capacitive touch panel, said driver circuit powered by a boosted supply voltage; and a charge pump circuit configured to receive an input supply voltage and output the boosted supply voltage, wherein a switching operation of said charge pump circuit to generate the boosted supply voltage occurs at a second frequency equal to an integer multiple of said first frequency. The integer multiple may, for example, comprise any integer greater than or equal to one.

In an embodiment, a method comprises: applying an alternating current (AC) drive signal having a first frequency and a high logic level at a boosted supply voltage to a capacitive sensing line of a capacitive touch panel; and boosting an input voltage to generate the boosted supply voltage, wherein boosting is performed synchronous to assertion of the AC drive signal. This boosting operation is further adaptive to different capacitive load of a touch panel receiving the AC drive signal by adjusting a slew-rate for charge transfer in the voltage boosting operation.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 2:
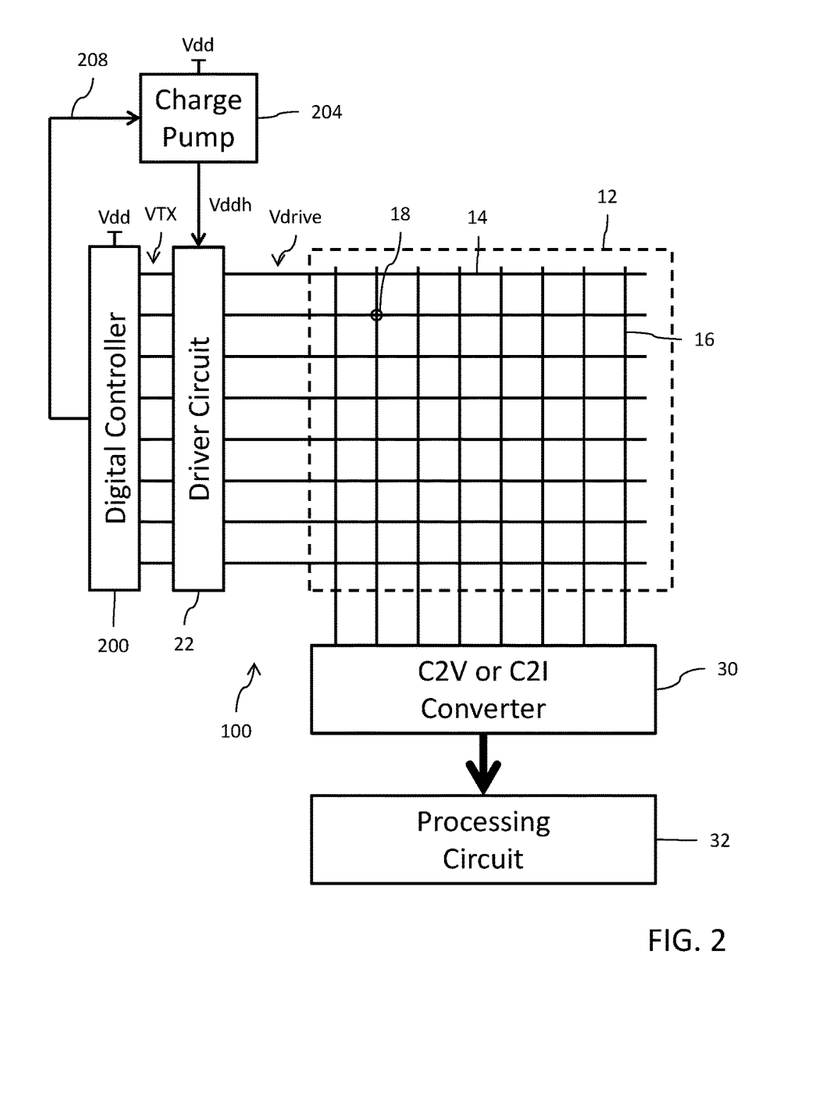
FIG. 2 shows a configuration for a touch screen system configured for operation in mutual-capacitance mode with a synchronized charge pump.

Reference is now made to FIG. 2 showing a configuration for a touch screen system 100. The system 100 includes a touch panel 12 formed by a plurality of parallel drive lines 14 and a plurality of parallel sense lines 16. The drive lines 14 and sense lines 16 are typically formed of a transparent material (such as, for example, indium tin oxide ITO) so as to not obscure a visual display system (not shown) positioned underneath the panel 12. The drive lines 14 and sense lines 16 can, for example, each be formed of a plurality of series connected diamond shapes. The drive lines 14 extend across the panel 12 with a first orientation direction (for example, horizontal) and the sense lines extend across the panel 12 with a second orientation direction (for example, vertical) such that the lines 14 cross over the lines 16 (or vice versa). However, the plane containing the lines 14 and the plane containing the lines 16 are separated from each other by a layer of dielectric material. A sense capacitor 18 is accordingly formed at each location where the lines 14 and 16 cross.

A digital controller circuit 200 generates an alternating current (AC) drive signal (VTX), for example, in the form of a square wave, and sequentially applies that AC drive signal to the drive lines 14 through a driver circuit 22. The AC drive signal has a frequency fd that is, for example, in the range of 100-300 kHz and is typically at 200 kHz.

The digital controller circuit 200 is powered from a power supply voltage Vdd, with Vdd typically at 3.3V. The driver circuit 22, however, is powered from a power supply voltage Vddh, where Vddh>Vdd, with Vddh for example at 6V, 9V, 12V, 16V higher as needed. A charge pump circuit 204, powered from the power supply voltage Vdd, operates to boost the Vdd voltage to produce the Vddh voltage. The digital controller circuit 200 supplies an AC control signal 208 to the charge pump circuit 204 to control the boost switching operation that generates the Vddh voltage. The AC control signal 208 has a frequency fo that is, for example, the same frequency fd as the AC drive signal. In an embodiment, the AC control signal 208 and the AC drive signal are phase aligned.

The driver circuit 22 includes a level shifting and buffering circuit to level shift the AC drive signal output from the digital controller circuit 200 from the Vdd voltage level to the Vddh voltage level to generate the level-shifted AC drive signal (Vdrive) for application to the drive lines 14.

A conversion circuit 30 such as a charge to voltage (C2V) converter circuit (or a charge to current (C2I) converter circuit) is coupled to the sense lines 16. The conversion circuit 30 senses the charge at each sense capacitor 18 and converts the sensed charge to an output signal (voltage or current) indicative of the sensed charge. The amount of charge at each sense capacitor 18 is a function of the AC drive signal, the capacitance between the drive line 14 and sense line 16 at the sense capacitor 18 and the influence of a touch capacitance contributed by the presence of an object (such as a finger or stylus) in proximity to the drive lines 14 and sense lines 16 of the panel 12. A processing circuit 32 receives the output voltages from the conversion circuit 30 for each sense capacitor 18. The output voltages are processed to determine the presence (touch and/or hover) of the object and the location of the object.

The touch screen system 100 is configured with the charge pump circuit 204 synchronized to the application of the AC drive signal to the drive lines 14 of the panel 12 and adaptive to different capacitive loads in different modes of operation (for example, mutual-capacitance sensing or self-capacitance sensing) of the panel 12. This results in a higher efficiency of the charge pump circuit 204 and a reduction in system noise in comparison to the FIG. 1 circuit. The principle of operation with system 100 is to take advantage of the fact that the load of the charge pump circuit 204 is not a continuously resistive load (as in FIG. 1), but is instead a sample switching capacitor load. The charge pump circuit 204 is controlled for operation at a much lower operating frequency fo (that is equal to the frequency fd of the AC drive signal) resulting in an improvement in power consumption (with an efficiency of 85-90%). Additionally, the synchronized operation of the charge pump advantageously ensures that the voltage is well settled by the time the conversion circuit 30 senses the charge at the sense capacitor 18. At all other times, accurate regulation of the voltage output from the charge pump circuit 204 is not required.

Figure 3A:
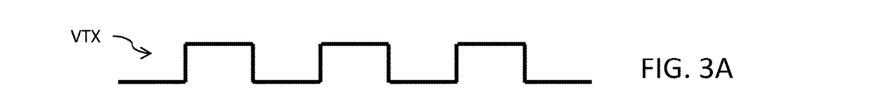
FIGS. 3A, 3B and 3C show waveforms for the AC drive signal and AC control signal.
Figure 3B:
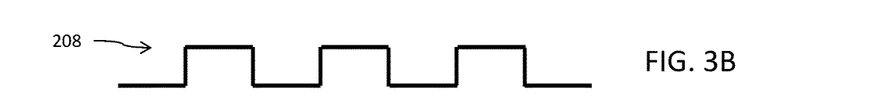
Figure 3C:
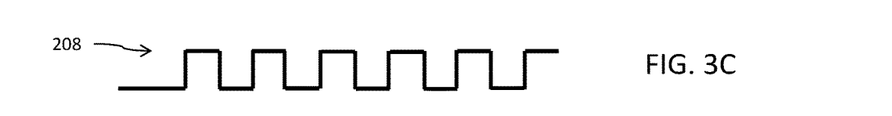

FIG. 3A shows an example of the waveform for the AC drive signal (VTX) generated by the digital controller circuit 200. FIG. 3B shows an example of the waveform for the AC control signal 208 generated by the digital controller circuit 200. These signals have a same frequency with substantially aligned phases. In an alternative embodiment, the control signal 208 may instead have a frequency that is an integer multiple of the frequency of the AC drive signal (VTX) with phase alignment to the AC drive signal VTX as shown in the example of FIG. 3C where the integer multiple is two.

Figure 4:
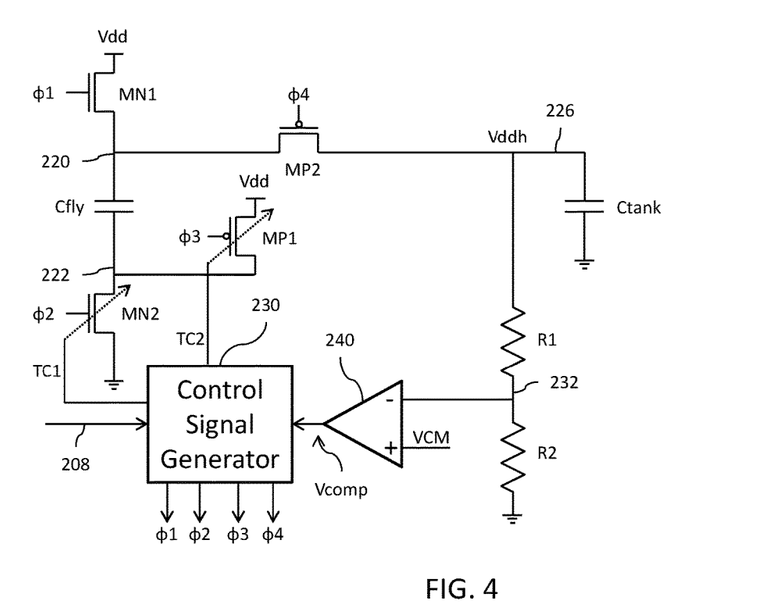
FIG. 4 is a circuit diagram of the charge pump circuit.

Reference is now made to FIG. 4 showing a circuit diagram of the charge pump circuit 204. The circuit 204 includes an n-channel MOS transistor MN1 having source terminal coupled to receive the input Vdd voltage level and a drain terminal coupled to an intermediate node 220. The gate terminal of transistor MN1 is controlled by a first control signal ($\phi$1). A first plate of a flyback capacitor Cfly is coupled to the intermediate node 220. An n-channel transistor MN2 has a drain terminal coupled an intermediate node 222 and a source terminal coupled to receive the ground voltage. The gate terminal of transistor MN2 is controlled by a second control signal ($\phi$2). A second plate of the flyback capacitor Cfly is coupled to the intermediate node 222. A p-channel MOS transistor MP1 has a source terminal coupled to receive the input Vdd voltage level and a drain terminal coupled to the intermediate node 222. The gate terminal of transistor MP1 is controlled by a third control signal ($\phi$3). A p-channel MOS transistor MP2 has a drain terminal coupled to the intermediate node 220 and a source terminal coupled to an output node 226 which generates the Vddh voltage level. The gate terminal of transistor MP2 is controlled by a fourth control signal ($\phi$4). A first plate of an output tank capacitor Ctank is coupled to the output node 226. A second plate of an output tank capacitor Ctank is coupled to the ground voltage.

The n-channel transistor MN2 may comprise a tunable transistor. In particular, the transistor MN2 has a conduction that is tuned in response to a control signal TC1. During start-up operation of the charge pump circuit 204, the control signal TC1 can exercise control over MOSFET drive and time duration so as to reduce the change of an excessive inrush current.

The p-channel MOS transistor MP1 may also comprise a tunable transistor. In particular, the transistor MP1 has a conduction that is tunable in response to control signal TC2. Responsive to operating mode, the control signal TC2 can exercise control over device conduction based on the capacitive load coupled to receive the Vddh voltage level. For example, the panel 12 has a relatively lower capacitive load when operating in a mutual capacitance operating mode, but has a relatively higher capacitive load when operating in a self capacitance operating mode. The charge pump circuit 204 must be able to adapt to these capacitive load differences. This is accomplished through control signal TC2, with adjust of transistor MP1 conduction effectuating control over the slew-rate (transfer time) of the charge pump circuit 204. When the panel is in the mutual capacitance operating mode, the control signal TC2 tunes transistor MP1 for increased transfer time so that over pumping is reduced and the charge pump waveform is periodic in each cycle. When the panel is in the self capacitance operating mode, the control signal TC2 tunes transistor MP1 for decreased transfer time so that the output voltage reaches a desired value in each pump cycle. In effect, the control signal TC2 adjusts the charge rate dependent on operating mode.

The control signals φ1-φ4 are generated by a control signal generation circuit 230. The circuit 230 may, for example, comprise a logic circuit or microcontroller circuit. The circuit 230 receives the AC control signal 208 generated by the digital controller circuit 200 and generates from that AC control signal 208 and a sensing of the Vddh voltage level the various control signals φ1-φ4 with appropriate timings of edges to control switching of the transistors MN1, MN2, MP1 and MP2 to effectuate boosting of the input Vdd voltage level to generate the output Vddh voltage level.

Although FIG. 4 shows the control signals TC1 and TC2 as being generated by the control signal generator 230, this is by example only. The control signals TC1 and TC2 could alternatively be generated by some other control circuit for the system responsive to a sensing of or setting of the operation mode for the panel 12.

The charge pump circuit 204 further includes a voltage sensing circuit in the form of a resistive voltage divider comprised of series connected resistors R1 and R2 coupled between the output node 226 and the ground voltage. The intermediate node 232 of the series connected resistors R1 and R2 is a tap node outputting sensed voltage Vsense that is a fraction of the Vddh voltage level. A voltage comparator circuit 240 has an inverting input terminal coupled to the intermediate node 232 and a non-inverting input terminal coupled to receive a reference voltage VCM. The voltage comparator circuit 240 outputs a control signal Vcomp. The reference voltage may, for example, comprise a common mode voltage for the touch screen system 10 generated by a bandgap voltage generator circuit in a manner well known to those skilled in the art. The resistive voltage divider R1/R2 and voltage comparator circuit 240 function to sense the Vddh voltage level in comparison to a threshold voltage and generate the output control signal Vcomp indicative of that comparison. When Vcomp is in a first logic state (for example, logic "1"), this means that the Vddh voltage level is less than the threshold voltage and the control signal generation circuit 230 is enabled for operation to generate the various control signals φ1-φ4 from the AC control signal 208. Conversely, when Vcomp is in a second logic state (for example, logic "0"), this means that the Vddh voltage level is greater than or equal to the threshold voltage and the control signal generation circuit 230 is disabled from operation.

Figure 5:
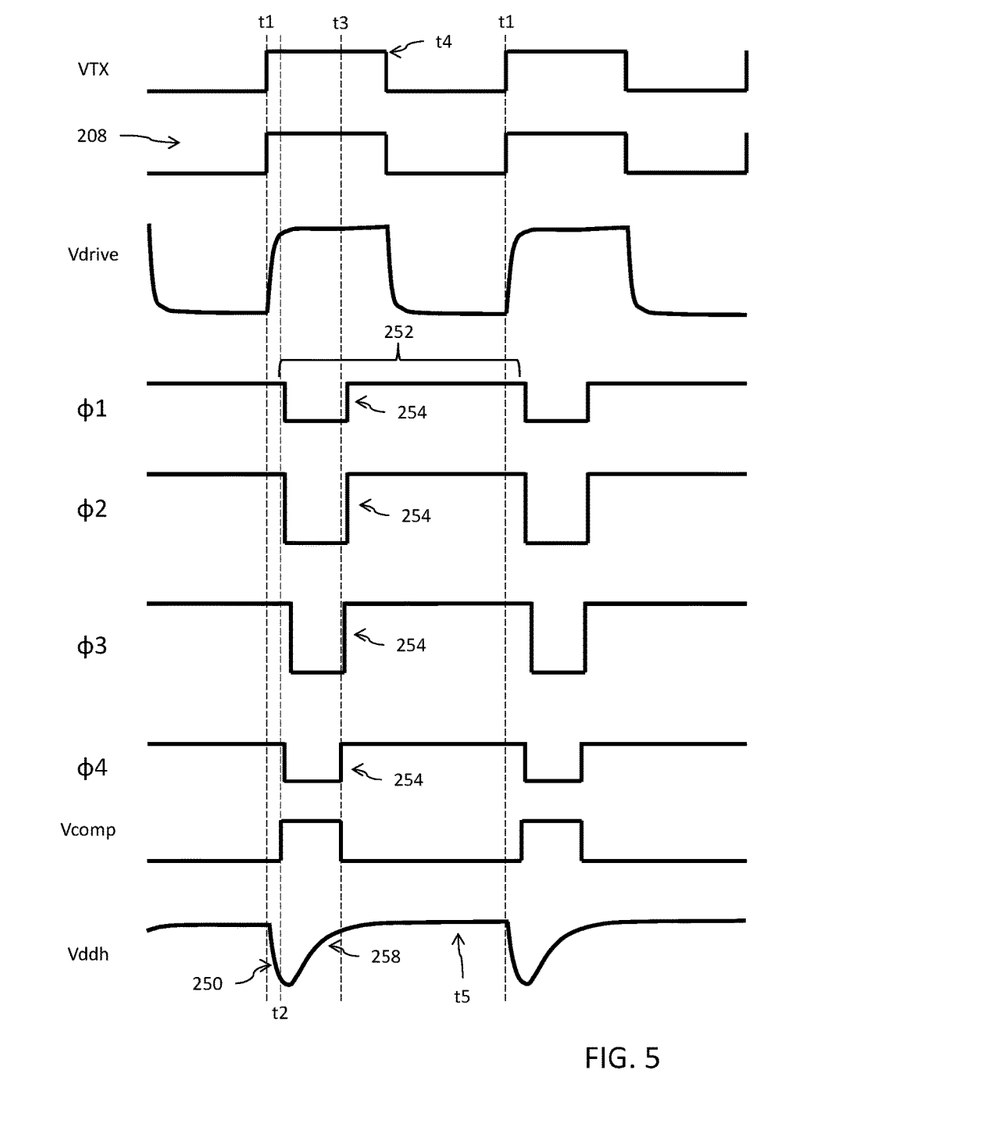
FIG. 5 shows waveforms for operation of the charge pump circuit and touch screen system.

FIG. 5 shows waveforms for operation of the charge pump circuit and touch screen system. Prior to time t1, the logic states of the control signals φ1-φ4 cause transistors MN1 and MN2 to be turned on (with transistors MP1 and MP2 turned off) and thus the voltage Vdd is stored across the flyback capacitor Cfly. At time t1, the digital controller circuit 200 asserts the AC drive signal VTX and the AC control signal 208 is simultaneously asserted. The driver circuit 22 receives the AC drive signal VTX, performs the level shifting operation and asserts the AC drive signal Vdrive. The level shifting and drive operation performed by the driver circuit 22 causes a drop in the Vddh voltage level (reference 250). The voltage drop is sensed by the resistive voltage divider R1/R2 and voltage comparator circuit 240, with the output Vcomp of the voltage comparator circuit 240 being asserted at time t2. The control signal generation circuit 230 is thus enabled for operation to generate logic state changes for the various control signals φ1-φ4 responsive to the assertion of the AC control signal 208. The change in logic states of the control signals φ1-φ4 near time t2 causes transistors MP1 and MP2 to be turned on (with transistors MN1 and MN2 turned off). The Vddh voltage is applied to the second plate of the flyback capacitor Cfly, and the first plate of the flyback capacitor Cfly is connected to the output node 226. Twice the Vddh voltage minus threshold voltage losses is supplied at the output node 226 and charge sharing occurs with the tank capacitor Ctank. As a result, the output voltage Vddh at the output node is boosted to recover from the voltage drop 250.

In a preferred embodiment, only one full cycle 252 of the generation of the control signals φ1-φ4 is performed in response to the AC control signal 208 and the assertion of the output Vcomp signal. In this context, one full cycle means one period such that one pulse 254 (with two edges) of each of the control signals φ1-φ4 occurs. The single full cycle is sufficient to cause the charge pump circuit 204 to boost the Vddh voltage level (reference 258).

The slew-rate of the charge transfer between times t2 and t3 is controlled by the tuning of transistor MP1 using control signal TC2. At time t3, the Vddh voltage level has recovered to the point where the Vddh voltage level exceeds the threshold. The output Vcomp of the voltage comparator circuit 240 is then deasserted. The charge pump circuit 204 is disabled and the control signal generation circuit 230 responds to the change in state of the output Vcomp by changing the logic state of the control signals φ1-φ4. Transfer of charge from the flyback capacitor Cfly to the tank capacitor Ctank terminates because transistor MP2 is turned off. The current logic states of the control signals φ1-φ4 after time t3 accordingly cause transistors MN1 and MN2 to be turned on (with transistors MP1 and MP2 turned off) and thus the voltage Vdd is again stored across the flyback capacitor Cfly. The operation of the charge pump circuit 204 to charge the flyback capacitor Cfly, boost and then dump charge to tank capacitor Ctank is accordingly performed synchronous to the assertion of the AC drive signal Vdrive and responsive to sensing the voltage level of the Vddh voltage.

At time t4, the digital controller circuit 200 deasserts the AC drive signal VTX and the AC control signal 208 is simultaneously deasserted. The driver circuit 22 responds to the AC drive signal VTX and deasserts the AC drive signal Vdrive. The Vddh voltage level recovers sufficiently from the charge sharing after boosting and settles prior to the time t5 that the C2V converter circuit 30 operates to sense the charge at the sense capacitor 18 and convert the sensed charge to an output voltage indicative of the sensed charge.

Thus, in operation, the enabling of the charge pump circuit 204 for operation to apply the boosted voltage to the output node 226 occurs synchronous to the assertion of the AC drive signals VTX and Vdrive. The switching control signals φ1-φ4 of the charge pump circuit 204 have a same frequency as the AC control signal 208 (and thus a same frequency as the AC drive signals VTX and Vdrive).

In an example implementation, the Vdd voltage level is 3.3V, the Vddh voltage level is 6.1 V, the logic low voltage level of the AC control signal 208, AC drive signal VTX, AC drive signal Vdrive and Vcomp signal is 0V, the logic high voltage level of the AC control signal 208, AC drive signal VTX and Vcomp signal is 3.3V, the logic high voltage level of the AC drive signal Vdrive is 6.1V, the logic low voltage level of the switching control signals φ2 and φ3 is 0V, the logic high voltage level of the switching control signals φ2 and φ3 is 3.3V, the logic low voltage level of the switching control signals φ1 and φ4 is 3.3V, and the logic high voltage level of the switching control signals φ1 and φ4 is 6.1V. It is accordingly noted that the switching control signals φ1 and φ4 are bootstrapped signals generated by the control signal generation circuit 230.

With reference to the waveforms for the control signals φ1-φ4, it will be noted that the edges of the signals are not aligned. This is purposeful in order to ensure that the control signals are not overlapping.

The MP1 transistor is tunable transistor responsive to the control signal TC2 in order to set the resistive-capacitive (RC) time constant of the circuit (where R is the on-resistance of the transistor and C is the capacitive load). The tuning of the transistor comprises changing the transistor drive which affects the on-resistance. The concern here is that if the RC time constant is too small, the charge pump will react too quickly and the inherent latency of the voltage comparator circuit 240 will cause the pumped Vddh voltage level to exceed the threshold set by the resistive voltage divider R1/R2 and VCM. Conversely, if the RC time constant is too large, the charge pump will react too slowly and the pumped Vddh voltage level will not reach the threshold set by the resistive voltage divider R1/R2 and VCM.

The tuning of the transistor MP1 may, for example, be performed in connection with the start-up of the circuit in dependence on an indication of whether the panel 12 is operating in the mutual capacitance sensing mode or the self capacitance sensing mode.

Figure 6:
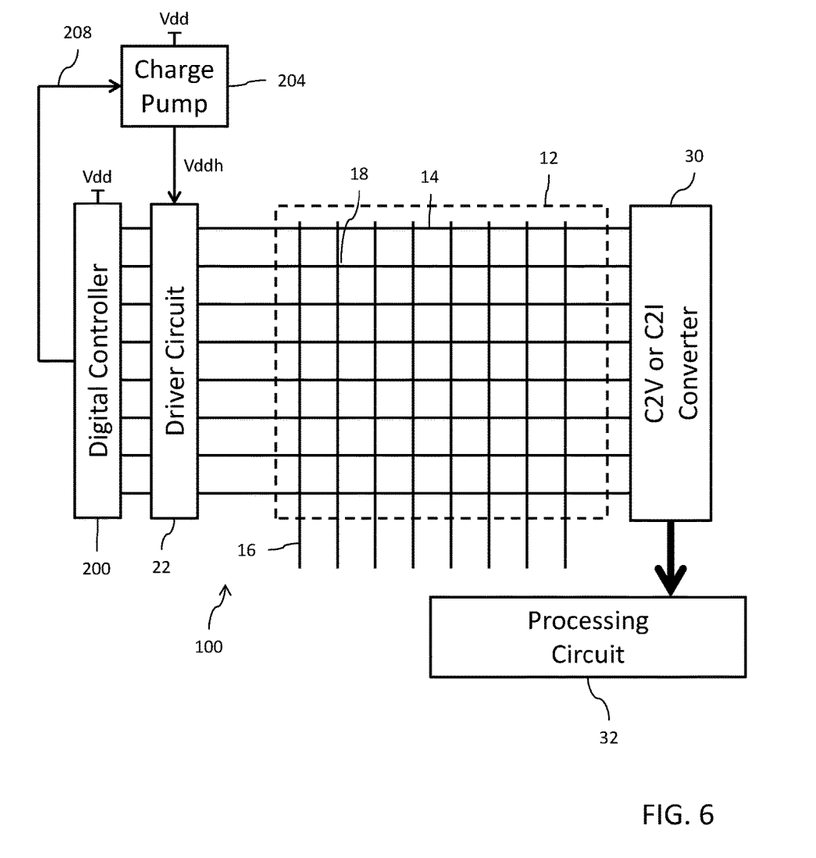
FIG. 6 shows a configuration for a touch screen system configured for operation in self-capacitance mode with a synchronized charge pump.

The implementation shown in FIG. 2 is specific to operation of the panel 12 in a mutual-capacitance mode of operation where the sensed capacitance is between two selected lines 14 and 16 at the sense capacitor 18. The synchronized charge pump circuit 204 is equally applicable to a panel 12 operating in a self-capacitance mode of operation. Such a configuration is illustrated in FIG. 6. In self-capacitance mode, the C2V converter circuit 30 senses the charge at a selected one of the drive or sense lines 14, 16 relative to a ground plane of the panel 12. The illustration of the circuits in FIG. 6 shows the configuration for the lines 14. The circuitry is duplicated for the lines 16 (not shown). In self-capacitance mode, the amount of charge at a given line 14 or 16 is a function of the AC drive signal, the capacitance between the line 14 or 16 and the ground plane and the influence of a touch capacitance contributed by the presence of an object (such as a finger or stylus) in proximity to the lines 14 and 16 of the panel 12.

There are a number of advantages which accrue from synchronization of the charge pump circuit 204 to the AC drive signals and adaptability of charge transfer time to different loading conditions: a) the operating behavior of the circuit is repetitive and thus does not inject unwanted switching noise which can be a concern with prior art charge pump circuit like that shown in FIG. 1; b) there is a decrease in power consumption because the Vddh voltage is regulated by the charge pump circuit only when necessary (specifically coincident with the assertion of the AC drive signals on the panel lines); c) charge is transferred in a single cycle as opposed to multiple cycles as in FIG. 1; and d) the timing of the assertion of the AC drive signals is known and regular and thus the circuit effectively anticipates the need to regulate the Vddh voltage and performs this operation only when needed.

With respect to adaptability of charge transfer time to different loading conditions: The voltage boosting circuit adapts the voltage boosting operation to the mutual-capacitance sensing mode of operation by tuning charge transfer time (slew-rate) so that over-pumping is reduced and a charge pump waveform is periodic in each pump cycle. Furthermore, the voltage boosting circuit adapts the voltage boosting operation to the self-capacitance sensing mode of operation by tuning charge transfer time (slew-rate) so that an output reaches a certain value in each pump cycle.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
   a driver circuit configured to apply an alternating current (AC) drive signal having a first frequency to a capacitive sensing line of a capacitive touch panel, said driver circuit powered by a boosted supply voltage; and
   a charge pump circuit configured to receive an input supply voltage and output the boosted supply voltage, wherein said charge pump circuit is enabled to perform a voltage boosting operation synchronous to assertion of the AC drive signal;
   wherein the voltage boosting operation is further adaptive to different capacitive loads of the capacitive touch panel receiving the AC drive signal.

2. The circuit of claim 1, wherein the capacitive touch panel is operable in a mutual-capacitance sensing mode of operation, and the charge pump circuit adapts the voltage boosting operation to the capacitive load of the mutual-capacitance sensing mode of operation by tuning a charge transfer time so that over-pumping is reduced and a charge pump waveform is periodic in each pump cycle.

3. The circuit of claim 1, wherein the capacitive touch panel is operable in a self-capacitance sensing mode of operation, and the charge pump circuit adapts the voltage boosting operation to the capacitive load of the self-capacitance sensing mode of operation by tuning a charge transfer time so that an output reaches a certain value in each pump cycle.

4. A circuit, comprising:
   a driver circuit configured to apply an alternating current (AC) drive signal having a first frequency to a capacitive sensing line of a capacitive touch panel, said driver circuit powered by a boosted supply voltage; and
   a charge pump circuit configured to receive an input supply voltage and output the boosted supply voltage, wherein said charge pump circuit is enabled to perform a voltage boosting operation synchronous to assertion of the AC drive signal, wherein the charge pump circuit comprises:
      a flyback capacitor and a plurality of transistors coupled to the flyback capacitor, the plurality of transistors having control terminals configured to receive corresponding control signals, wherein switching of the control signals occurs synchronous to assertion of the AC drive signal.

5. The circuit of claim 4, wherein the control signals are non-overlapping control signals.

6. The circuit of claim 5, wherein the charge pump circuit further comprises:

a voltage sensing circuit configured to sense the boosted supply voltage; and a comparison circuit configured to compare the sensed boosted supply voltage to a threshold and control switching of the control signals.

7. The circuit of claim 6, wherein the comparison circuit detects a voltage drop in the boosted supply voltage as a result of assertion of the AC drive signal.

8. The circuit of claim 4, wherein the control signals each have a second frequency that is an integer multiple of the first frequency, said integer multiple being greater than or equal to one.

9. The circuit of claim 4, wherein the plurality of transistors include:
   a first transistor coupled between a first plate of the flyback capacitor and a boosted supply voltage output node; and
   a second transistor coupled between a second plate of the flyback capacitor and the input supply voltage;
   wherein the second transistor has an adjustable conduction set in response to operating mode of the capacitive touch panel.

10. The circuit of claim 9, wherein said operating mode is one of a mutual capacitance operating mode and a self capacitance operating mode.

11. The circuit of claim 10, wherein the adjustable conduction changes an RC time constant of the charge pump circuit.

12. A circuit, comprising:
   a driver circuit configured to apply an alternating current (AC) drive signal having a first frequency to a capacitive sensing line of a capacitive touch panel, said driver circuit powered by a boosted supply voltage;
   a charge pump circuit configured to receive an input supply voltage and output the boosted supply voltage, wherein said charge pump circuit is enabled to perform a voltage boosting operation synchronous to assertion of the AC drive signal; and
   a digital circuit configured to control generation of the AC drive signal and further generate an AC control signal having a same frequency and phase as the AC drive signal;
   wherein the charge pump circuit is a flyback switching circuit operating responsive to switching control signals generated in response to the AC control signal.

13. The circuit of claim 12, wherein the switching control signals have a frequency that is an integer multiple of the AC control signal, said integer multiple being greater than or equal to one.

14. A circuit, comprising:
   a driver circuit configured to apply an alternating current (AC) drive signal having a first frequency to a capacitive sensing line of a capacitive touch panel, said driver circuit powered by a boosted supply voltage; and
   a charge pump circuit configured to receive an input supply voltage and output the boosted supply voltage, wherein a switching operation of said charge pump circuit to generate the boosted supply voltage occurs at a second frequency that is an integer multiple of said first frequency, said integer multiple being greater than or equal to one;
   wherein the charge pump circuit is enabled to perform the switching operation synchronous to assertion of the AC drive signal; and
   wherein the charge pump circuit comprises:
      a voltage sensing circuit configured to sense the boosted supply voltage; and
      a comparison circuit configured to compare the sensed boosted supply voltage to a threshold and instigate the switching operation in response to the sensed boosted supply voltage falling below the threshold.

15. The circuit of claim 14, wherein the comparison circuit detects a voltage drop in the boosted supply voltage as a result of assertion of the AC drive signal.

16. A circuit, comprising:
   a driver circuit configured to apply an alternating current (AC) drive signal having a first frequency to a capacitive sensing line of a capacitive touch panel, said driver circuit powered by a boosted supply voltage; and
   a charge pump circuit configured to receive an input supply voltage and output the boosted supply voltage, wherein a switching operation of said charge pump circuit to generate the boosted supply voltage occurs at a second frequency that is an integer multiple of said first frequency, said integer multiple being greater than or equal to one, wherein the charge pump circuit comprises:
      a flyback capacitor and a plurality of transistors coupled to the flyback capacitor, the plurality of transistors having control terminals configured to receive corresponding control signals, wherein said switching operation comprises switching of the control signals.

17. The circuit of claim 16, further comprising:
   a digital circuit configured to control generation of the AC drive signal and further generate an AC control signal having a same frequency and phase as the AC drive signal;
   wherein the switching control signals are generated in response to the AC control signal.

18. The circuit of claim 16, wherein the plurality of transistors include:
   a first transistor coupled between a first plate of the flyback capacitor and a boosted supply voltage output node; and
   a second transistor coupled between a second plate of the flyback capacitor and the input supply voltage;
   wherein the second transistor has an adjustable conduction set in response to operating mode of the capacitive touch panel.

19. The circuit of claim 18, wherein said operating mode is one of a mutual capacitance operating mode and a self capacitance operating mode.

20. The circuit of claim 19, wherein the adjustable conduction changes an RC time constant of the charge pump circuit.

* * * * *